United States Patent [19]
Rakonjac et al.

[11] Patent Number: 5,316,605
[45] Date of Patent: May 31, 1994

[54] METHOD OF MANUFACTURING AND INFLATABLE FIGURE FROM FLEXIBLE PLASTIC SHEET MATERIAL

[75] Inventors: Zoran Rakonjac, Burbank, Calif.; Martin Tucker, 11960 Borden Ave., San Fernando, Calif. 91340

[73] Assignee: Martin Tucker, San Fernando, Calif.; a part interest

[21] Appl. No.: 897,928

[22] Filed: Jun. 15, 1992

[51] Int. Cl.⁵ .............................................. B32B 31/04
[52] U.S. Cl. ...................................... 156/145; 156/245; 156/285; 156/292; 446/220; 446/221; 446/226
[58] Field of Search ............... 156/145, 147, 245, 285, 156/292; 264/545, 554, 571; 425/388, 403, 405.1, DIG. 57, DIG. 60, 85; 446/220, 221, 225, 226

[56] References Cited

U.S. PATENT DOCUMENTS

| | | | |
|---|---|---|---|
| 1,610,155 | 12/1926 | Riley et al. | 446/226 |
| 1,881,048 | 10/1932 | Dorogi et al. | 156/292 |
| 2,053,371 | 9/1936 | Lee | 156/245 |
| 2,099,058 | 11/1937 | Frissell | 446/226 |
| 2,170,539 | 8/1939 | Schoberg | 446/226 |
| 3,649,152 | 3/1972 | Knack | 425/85 |

*Primary Examiner*—Caleb Weston
*Attorney, Agent, or Firm*—Erik M. Arnhem

[57] ABSTRACT

An inflatable three dimensional body is formed out of two thin sheets of flexible thermoplastic material by vacuum-forming surface contours in the sheets, and then securing the edge areas of the sheets together, as by heat welding. The mold member used in the vacuum-forming step is constructed so that convex projections on the mold member surface are sized differently than the corresponding projections in the pressurized hollow body. The mold member design takes into account contour changes taking place in the plastic sheet materials during the pressurization step.

5 Claims, 1 Drawing Sheet

METHOD OF MANUFACTURING AND INFLATABLE FIGURE FROM FLEXIBLE PLASTIC SHEET MATERIAL

BACKGROUND OF THE INVENTION

1. Field of Invention

This invention relates to inflatable figures formed out of flexible plastic sheet material that is molded to define projections and depressions in the surface of the figure. Typically two plastic sheets of polyvinyl chloride plastic are secured to each other around mated peripheral edges of the sheets, after which air or other gas is pumped into the sealed space within the sheets to form an inflated three dimensional figure.

2. Prior Art Developments

It is known that flat flexible sheets of thin plastic material, e.g. polyvinyl chloride, can be reconfigured into two dimensional shapes by subjecting the sheet to a vacuum forming operation. The vacuum-forming process involves heating a sheet of plastic to its softening temperature, draping the softened sheet over a rigid mold member formed of a porous material, and applying a vacuum force to the underside of the mold member. Air is drawn through the pores (holes) in the mold member, such that the plastic sheet is drawn tightly against the mold member by air suction (vacuum) effect. As the sheet cools from its softened condition it is rigidified into the shape of the mold member surface. The plastic sheet is relatively thin so that it cools relatively quickly while it is lying on the mold member surface. When the air cooled sheet is lifted away from the mold member surface it will retain the two dimensional shape given to it by the vacuum forces derived by air flow through the small holes in the mold member.

U.S. Pat. No. 3,649,152, issued to John Knack on Mar. 14, 1972, discloses a vacuum-forming machine that can be used to form flat plastic sheets into two dimensional shapes.

It is also known that two shaped plastic sheets can be secured together along their mating peripheral edges to form a hollow sealed figure, e.g. a toy clown, toy elephant, or toy football. Pressurized air or other gas can be pumped into the interior space within the hollow figure to define and maintain the desired three dimensional shape of the figure. The final shape of the inflated figure corresponds approximately to the surface contours on the rigid mold members used initially to vacuum-form the component plastic sheets to their two-dimensional shapes (prior to the process of securing the two sheets together).

One problem with the existing methods of manufacturing such inflated figures is that although the plastic sheet material is nominally non-elastic (but flexible), yet when the hollow sheet material figure is pressurized (by pumping air or other gas into the figure) some localized portions of the sheet material figure will expand or deflect outwardly to an undesired extent, thereby distorting the appearance of the figure in its pressurized condition. The present invention is concerned with changes in the manufacturing process intended to minimize or prevent such localized surface distortions.

SUMMARY OF THE INVENTION

The present invention utilizes the vacuum-forming process to make contoured two dimensional sheets that can later be adhesively secured together to form a sealed inflatable figure. In order to preclude or minimize undesired distortions in the three dimensional figure the mold members used in the vacuum-forming process are contoured so that localized protruding portions of the mold members are undersized relative to the corresponding projections in the final three dimensional figure. When air or other gas is later pumped into the hollow sealed plastic sheet structure the undersized projections formed in the plastic sheet will be expanded to a point where the surface contour of the pressurized figure is at least approximately the desired shape.

In carrying out the process of this invention only the smaller projections of the mold members are constructed to be undersized. The larger dimensioned convex surface (i.e. surfaces having a larger radius of curvature) are formed to the size of the final pressurized plastic figure. The invention provides a mechanism for localized expansion of the smaller size projections on the two dimensional plastic sheets, whereby the pressurized three dimensional figure has a desired appearance free from distortions due to localized expansion effects during the process of pressurizing the hollow figure.

THE DRAWINGS

DESCRIPTION OF A PREFERRED METHOD EMBODYING THE INVENTION

Figure 1:
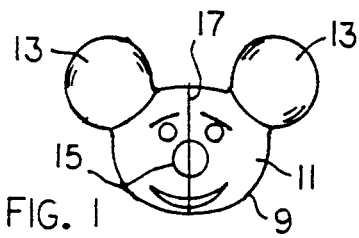
FIG. 1 is a front view of a hollow pressurized figure adapted to be formed by the process of the present invention.
Figure 2:
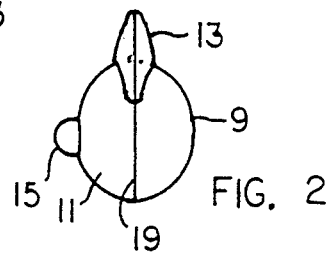
FIG. 2 is a side elevational view of the pressurized figure shown in FIG. 1.
Figure 9:
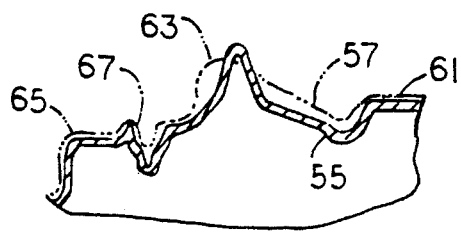
FIG. 9 is a fragmentary sectional view through a mold member that can be used in practice of the invention.

FIGS. 1 and 2 illustrate a hollow FIG. 9 that can be formed by the method of this invention. The figure (or hollow body) is three dimensional and curvilinear to resemble the head (face) of a clown or mouse. The curved major face area 11 of the hollow figure has two hollow projecting portions 13 representing the ears of the mouse, and a third hollow projection 15 representing the nose of the mouse. The projecting portions 13, 13 and 15 are integrally formed with the face area 11, such that the entire figure is comprised of two thin plastic sheets formed of a flexible, essentially non-elastic material such as polyvinyl chloride. Commercially available thermoplastic material in sheet form having a thickness of about 0.005 inch can be used. The sheet material is flexible but not to any appreciable extent elastic; the material thus differs from sheet rubber.

The illustrated figure (or hollow body) 9 can be formed of two thin contoured sheets secured together at their mating peripheral edges, as by heat welding. The parting line between the two contoured sheets can be in a front-to-rear plane, or in a side-to-side plane. FIG. 1 shows the parting line 17 extending in a front-to-rear plane. FIG. 2 shows a parting line 19 extending in a side-to-side plane. Either construction can be used in practice of the invention. In either case, the shape of the figure hollow body 9 is maintained by a pressurized gas pumped into the hollow figure after the two plastic sheets have been secured together along the parting line 17 or 19. Usually the pressurizing gas will be air, although other lighter-than-air gases could be used.

Figure 8:
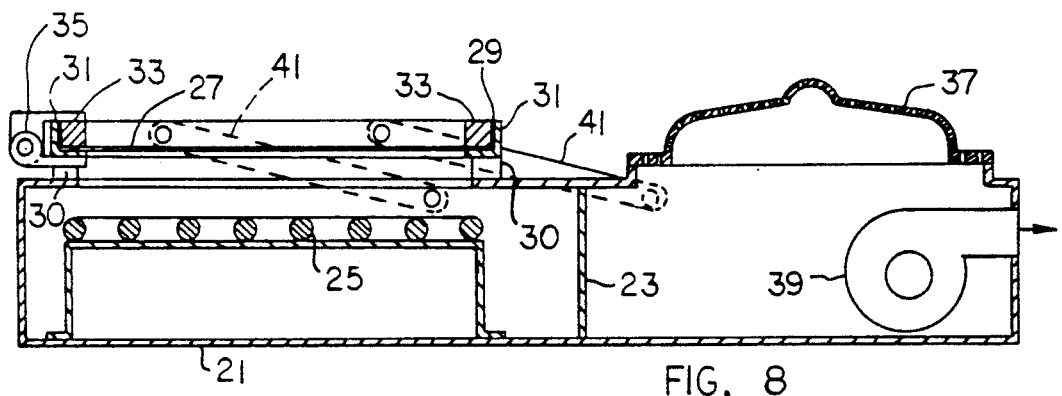
FIG. 8 is a sectional view through an apparatus that can be used to vacuum-form a two dimensional plastic sheet according to the present invention.

FIG. 8 shows an apparatus that can used to form each of the contoured plastic sheets. The apparatus comprises a housing 21 having an internal partition 23 that subdivides the housing into two chambers. An electric heating coil 25 is disposed withon one of the chambers for directing heated air upwardly against a thin sheet of thermoplastic material 27 held in a rectangular frame structure 29.

Frame structure 29 comprises an outer annular frame formed by four connected angle members 31, and an inner annular frame formed by four connected rectangular bars 33. The two frames are interconnected by a hinge means 35, whereby the inner frame can be swung around the hinge axis to load or unload the thermoplastic sheet 27. The two frames can be closed on one another to clamp the sheet therebetween, as shown in FIG. 8.

In the position of FIG. 8, frame structure 29 rests against support blocks 30 carried by housing 21, with thermoplastic sheet 27 located directly above heating coil 25. The heater can thus heat the sheet to a softened pliable condition wherein it can be reformed to a non-flat state, e.g. with projections and surface contours resembling features of a mouse's head, as shown generally in FIGS. 1 and 2.

Reforming of the softened sheet 27 is accomplished on a contoured mold member 37 supported on the upper face of housing 21 The mold member has a porous nature comprised of a large multiplicity of small holes (pores) extending through the mold member wall along its entire face area. A motor-powered blower 39 is positioned within housing 21 for drawing air downwardly through the holes in mold member 37 and then outwardly to the external atmosphere, as designated by the arrow in FIG. 8.

The aforementioned frame structure 29 is pivotably connected to parallel links 41, said links being pivotably connected to housing 21, whereby the frame structure can be transported in a left-to-right direction for moving the clamped thermoplastic sheet 27 to a position draped over mold member 37. Bars 33 of the frame structure encircle the outer peripheral edge of mold member 37 so that the softened sheet 27 overlies mold member 37. At the same time blower 39 is energized to draw air downwardly through the holes in member 37, thereby achieving a vacuum-forming (reshaping) of sheet 27 to the surface contour of the mold member. When the sheet 27 has air cooled to a temperature below its softening point the blower is de-energized and the reconfigured sheet is removed from frame structure 29 (by swinging the inner frame to its open position).

The vacuum-forming apparatus depicted in FIG. 8 is in all essential respects similar to the apparatus shown in aforementioned U.S. Pat. No. 3,649,152.

Each of the two contoured plastic sheets needed to form a three dimensional figure will have a different shape; each sheet thus requires a differently configured mold member 37. However, the vacuum-forming apparatus is the same as regards overall construction and mode of operation. The two specially configured plastic sheets will have peripheral edge flanges that can be heat sealed together along a parting line to form a hollow sealed body, e g. the hollow body shown in FIGS. 1 and 2. After the heat sealing operation the sealed flanges can be trimmed (cut) to form a narrow unobtrusive connection between the two sheets. Air can then be pumped into the hollow body (via a needle connection at the sheet parting line), whereby the body (figure) is internally pressurized to maintain the shape given to the two plastics sheets by the two respective mold members.

The drawing shows a single mold member 37 supported on housing 21. However, a plural number of similarly-configured mold members can be supported on the housing. The single thermoplastic sheet would then be used to form a plural number of contoured sheet sections. Mating sheets can be heat welded together and then cut through to form and separate the multiple hollow bodies. The general process is old in the art.

One problem with conventionally manufactured hollow bodies comprised of vacuum-formed thermoplastic sheets, is that the pressurizing operation tends to distort the sheet contours, especially small projections protruding from major surface areas of the body, e.g. nose 15 or ears 13 in FIGS. 1 and 2. The internal pressure tends to deform the small projections so that the shape of a given projection is different after the pressurizing process. The present invention is concerned with designing the mold member so that the subsequent pressurizing process deforms the small projections toward their desired shapes rather than away from their desired shapes.

Figure 6:
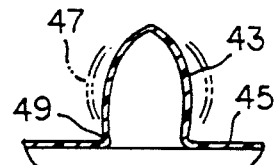
FIG. 6 is a fragmentary sectional view through a protruding portion of a plastic sheet (wall) that forms part of a hollow inflatable figure. Dashed lines are added to show the effect that internal pressure can have on the protruding portion of the plastic sheet (wall).
Figure 7:
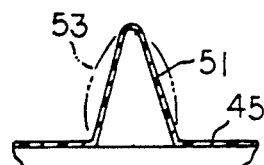
FIG. 7 is a view taken in the same direction as FIG. 6, but illustrating a way to reduce the adverse effects of internal pressure on the plastic wall.

FIGS. 6 and 7 illustrate generally how the projecting portion of a flexible sheet can change during a pressurizing operation. Referring to FIG. 6, it will be assumed that numeral 43 represents the desired configuration of a projection extending from a major surface area 45 of the formed hollow body. It will also be assumed that the mold member is configured to the internal curvature of projection 43, such that numeral 43 represents the projection prior to pressurization of the hollow body.

When the hollow body is pressurized the projection will tend to assume the bulged configuration represented by dashed lines 47. The air pressure within the projection will tend to expand the thin plastic wall of the projection toward a spherical condition. Neck area 49 that joins the projection to surface area 45 will not be significantly enlarged. The major configurational change will be in the zone spaced outwardly from the neck area; the projection will tend to contract in a direction toward surface area 45 and expand in a direction paralleling surface area 45, so as to assume a generally spherical contour that is different than the desired contour represented by numeral 43.

FIG. 7 illustrates a configurational change designed to avoid the problem illustrated by FIG. 6. In this case, the mold member is configured to provide the projection shape represented by numeral 51 (full lines). When the plastic sheet body is pressurized the projection will tend to expand laterally and contract slightly in a direction toward surface are 45, thereby producing a pressurized condition represented by numeral 53 (dashed lines). Numeral 53 represents the desired configuration (i.e. the shape illustrated at 43 in FIG. 6).

Figure 3:
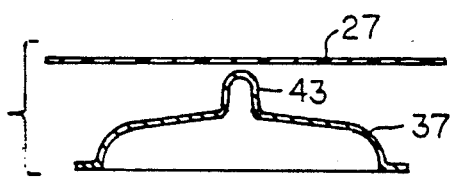
FIG. 3 is a schematic representation of a mold member and a plastic sheet that can be formed to a two dimensional shape on the mold member.
Figure 4:
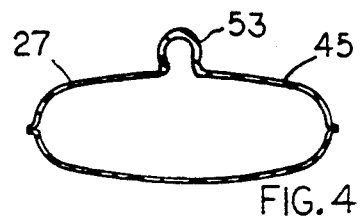
FIG. 4 is a cross sectional view taken through a hollow plastic sheet figure, and showing one type of distortion that can occur during the process of pressurizing the hollow figure.
Figure 5:
FIG. 5 is a sectional view through a mold member that can be used in practice of the invention, as an alternative to the mold members shown in FIG. 3.

The principal feature of this invention is the mold member dimensioning whereby localized projections on the plastic sheet body are higher and narrower than the desired heighth and width in the final pressurized product. The mold member changes are illustrated by FIGS. 3 and 5, wherein FIG. 3 represents an undesired mold member configuration, and FIG. 5 represents a desired mold member configuration (corresponding to the shape of the plastic sheet achieved in FIG. 7)

FIG. 9 shows a mold member configuration designed to duplicate a human face; the mold member is represented by the full lines 55, whereas the final shape of the plastic sheet (after pressurization) is represented by numeral 57. In FIG. 9, numeral 61 represents the forehead, numeral 63 represents the nose, numeral 67 represents the mouth, and numeral 65 represents the chin.

During the pressurization process the tip areas of the nose, mouth and chin may tend to retract slightly toward the major plane of the plastic sheet body, whereas the other areas of the nose, mouth and chin will tend to bulge away from the major plane of the plastic sheet body, i.e. upwardly in FIG. 9. Projecting zones of relatively small curvature radius will have an increased radius of curvature after the pressurization step, e.g. the tip areas of the nose, chin and mouth. Therefore, when designing the mold the tip areas of the projections will be sharpened (i.e. have a relatively small radius of curvature) in order that the final shape be the desired shape.

The invention is concerned with mold member design features that will compensate for changes in contour of the plastic body taking place during the pressurization step. Particular features of the invention are recited in the appended claims.

What is claimed is:

1. A method of forming a hollow three dimensional inflatable figure out of flexible plastic sheet material, comprising the steps of:

(a) providing a porous mold member having a major shape-defining surface area, and at least one convex projection extending from said major surface area to define a localized protruding portion of the surface contour on the inflatable figure; said convex projection extending from said major surface area a substantially greater distance than the projection distance of the corresponding surface contour on the figure after inflation; said convex projection having a thickness dimension extending in a direction parallel to said major surface area; the thickness dimension of said projection being less than the corresponding dimension on the figure after inflation;

(b) heating a flexible plastic sheet to a softened condition wherein the sheet can be reformed into a three dimensional configuration;

(c) draping the softened plastic sheet over the porous mold member;

(d) applying a suction force to the porous mold member, to thereby draw the still softened sheet against the mold member surface whereby the sheet is reconfigured to the three dimensional shape of the mold member; repeating steps a through d, using a second flexible plastic sheet and a differently configured mold member;

(e) adhesively attaching peripheral edge areas of the first and second sheets together to form an inflatable figure, and (f) pressurizing the inflatable figure to reconfigure the aforementioned convex projection to a desired surface contour.

2. The method of claim 1, wherein said projection on the mold member comprises an annular neck area joining the projection to the major surface area of the mold member; said annular neck area having essentially the same size and shape as the corresponding structure on the hollow inflatable figure.

3. The method of claim 1, wherein each sheet is formed of polyvinyl chloride plastic sheet material that is nominally flexible but not elastic, whereby the major shape of the inflatable figure is defined by the surface contour on the mold members.

4. The method of claim 1, wherein said convex projection has a tip spaced from the plane of said major surface area; said tip having a radius of curvature that is less than the radius of curvature of the corresponding surface on the figure after inflation.

5. The method of claim 4, wherein said convex projection comprises an annular neck area joining the projection to the major surface area of the mold member; said projection having an intermediate area between said neck area and said tip; said intermediate area defining the thickness dimension of the dimension of the projection.

* * * * *